United States Patent [19]

Coppola et al.

[11] 4,123,286

[45] Oct. 31, 1978

[54] SILICON CARBIDE POWDER COMPOSITIONS

[75] Inventors: John A. Coppola, Lewiston; Harry A. Lawler; Carl H. McMurtry, both of Youngstown, all of N.Y.

[73] Assignee: The Carborundum Company, Niagara Falls, N.Y.

[21] Appl. No.: 754,648

[22] Filed: Dec. 27, 1976

[51] Int. Cl.$^2$ ............................................. C01B 31/36
[52] U.S. Cl. ..................................... 106/44; 423/345; 423/346
[58] Field of Search ................. 106/44; 423/345, 346; 264/65

[56] References Cited

U.S. PATENT DOCUMENTS

| | | | |
|---|---|---|---|
| 2,964,823 | 12/1960 | Fredriksson | 106/44 |
| 3,166,380 | 1/1965 | Kuhn | 423/346 |
| 3,203,814 | 8/1965 | Muta | 106/44 |
| 3,836,673 | 9/1974 | Weaver et al. | 423/345 X |
| 3,882,210 | 5/1965 | Crossley et al. | 423/346 |
| 3,966,855 | 6/1976 | Hollenberg et al. | 423/345 X |
| 4,023,975 | 5/1977 | Prochaza | 106/44 |
| 4,031,178 | 6/1977 | Johnson et al. | 106/44 |

*Primary Examiner*—G. O. Peters
*Attorney, Agent, or Firm*—David E. Dougherty; Raymond W. Green; Donald C. Studley

[57] ABSTRACT

A powder containing substantial amounts of alpha phase silicon carbide suitable for use in subsequent sintering operations to obtain a high-density, high-strength ceramic product is described. The powder may consist substantially entirely of alpha silicon carbide or may consist of mixtures of alpha and beta phase silicon carbide. The silicon carbide powder of the present invention has an average particle size of from about 0.10 to about 2.50 microns and may contain maximum amounts of the following materials by weight based upon 100 parts of powder.

| | |
|---|---|
| $SiO_2$ | 2.00 |
| Free Silicon | 0.25 |
| Iron | 0.50 |
| Alkali and Alkaline Earth Metals | 0.50 |
| Total Metal Oxides | 3.75 |

Sinterable powders and methods of producing sintered products from the powders are also described.

12 Claims, No Drawings

SILICON CARBIDE POWDER COMPOSITIONS

BACKGROUND OF THE INVENTION

Silicon carbide, a crystalline compound of silicon and carbide, has long been known for its hardness, its strength, and its excellent resistance to oxidation and corrosion. Silicon carbide has a low coefficient of expansion, good heat transfer properties and maintains high strength at elevated temperatures. In recent years, the art of producing high-density silicon carbide bodies from silicon carbide powers has been developed. Methods include reaction bonding, chemical vapor deposition, hot pressing and pressureless sintering (initially forming the article and subsequently sintering). Examples of these methods are described in U.S. Pat. Nos. 3,853,566; 3,852,099; 3,954,483; and 3,960,577. The high-density silicon carbide bodies so produced are excellent engineering materials and find utility in fabrication of components for turbines, heat exchange units, pumps, and other equipment or tools that are exposed to severe wear, corrosion, and/or operation under high temperature conditions. The present invention relates to silicon carbide powders that are adapted to use in the various methods of producing a high-density silicon carbide body by sintering, and further to the use of the alpha crystalline form of silicon carbide in such processes.

The silicon carbide powder of the present invention may be admixed with various other materials that act as sintering aids; for example, materials containing carbon, beryllium, or boron, to form a sinterable mixture of the desired characteristics or composition. Such powder mixtures may be hot-pressed (simultaneous pressing and sintering) or may be cold-pressed with subsequent sintering to produce high-strength, high-density products. The product is substantially non-porous and eminently useful in engineering applications. If desired, the high-density, high-strength silicon carbide product may subsequently be machined, usually by diamond grinding, but also by electrochemical machining, ultrasonic machining, or by electrical discharge machining techniques, to provide tools or machine components requiring close tolerances.

One of the problems previously encountered in the utilization of silicon carbide mixtures is that, at the usual sintering temperatures, 1950° to 2200° C., beta phase silicon carbide converts to alpha. This results in the formation of large grains of alpha silicon carbide and a substantial weakening of the product.

Various methods of preventing or minimizing this phase change have been attempted, such as initial elimination of the alpha phase silicon carbide from the starting material, using a nitrogen atmosphere in the sintering operation, and sintering at lower temperatures. The present invention requires no precautions against phase change as alpha phase silicon carbide is utilized initially and higher sintering temperatures, up to about 2500° C. are made possible.

SUMMARY OF THE INVENTION

Heretofore, the silicon carbide raw materials utilized in sinterable powders have been entirely, or substantially entirely, of the beta phase silicon carbide. Beta silicon carbide has a cubic crystalline structure. Beta silicon carbide is a low temperature form of silicon carbide and is more difficult to produce and potentially more expensive than the alpha (non-cubic) silicon carbide.

It has now been found that a powder containing substantial amounts of alpha silicon carbide may be produced that can be sintered and is useful in sintering processes which produce high-density, high-strength silicon carbide products previously requiring a beta silicon carbide as the starting material.

The powders of the present invention may consist substantially entirely of alpha silicon carbide or may consist of mixtures of alpha or beta silicon carbide. Heretofore, operable powders required the silicon carbide component to be substantially entirely of beta silicon carbide.

The characteristics of a typical powder of the present invention are as follows:

It has now been discovered that a silicon carbide powder, containing from about 5 to 100 percent alpha phase silicon carbide, requires certain criteria in order to be eminently useful in subsequent sintering operations. The combination of these criteria yields a sinterable powder and makes the use of alpha silicon carbide feasible and dependable. The present powders require a surface area of between about 2 and about 50 m$^2$/g, which will be described in detail below in relation to particle size. The present powders require a purity in which the following materials are present in the following maximum amounts:

|  | By Weight |
|---|---|
| SiO$_2$ | 2.00% maximum |
| Free Silicon | 0.25% maximum |
| Iron | 0.50% maximum |
| Alkali and Alkaline Earth Metals | 0.50% maximum |
| Total Metal Oxides | 3.75% maximum |

The powders of the present invention may be sintered by the usual art processes to obtain high-density, high-strength products. The usual method is by the addition of sintering aids such as beryllium or boron, and usually an excess of from about 0.5 to about 5.0 percent by weight carbon and carrying out the sintering operation in an inert atmosphere, for example, nitrogen, helium or argon.

The sintered products are useful as a material for tool, engineering materials and components of equipment that is exposed to severe wear or corrosion.

DETAILED DESCRIPTION

The theoretical density of silicon carbide is 3.21 gms/cc. Silicon carbide, per se, is not easily sintered to densities approaching theoretical. Utilizing the processes in co-pending application Ser. No. 584,226, filed June 5, 1975, the present powders may be used to produce silicon carbide materials having a density of at least 75 percent of the theoretical and preferably in excess of 90 percent of theoretical. Densities approaching 99 percent of theoretical are obtainable. For most applications a density of about 95 percent of theoretical, or greater, is desirable, and such densities are easily obtainable with the powders of the present invention.

The alpha form of silicon carbide is the form most commonly produced in an Acheson process furnace. The raw materials usually utilized in the Acheson process are high purity glass sand or quartz and a high grade of coke, usually low ash petroleum or pitch coke. The silicon carbide product forms in rather large crystals and requires milling to produce silicon carbide materials suited to use as abrasives or other grinding products. The silicon carbide product produced by the Acheson process consists substantially entirely of the alpha form of silicon carbide and is eminently suited to produce powders of the present invention.

Although the present silicon carbide powder may consist substantially entirely of alpha silicon carbide and a sinterable product produced, mixtures of the alpha and beta silicon carbides may also be utilized. Heretofore, the powders useful for sintering required a very high purity of beta silicon carbide and only a trace of alpha silicon carbide could be tolerated. Unlike the previous powders in which the alpha silicon carbide was considered a contaminant, and had to be eliminated, the present powders utilize the alpha silicon carbide and require no separation or purification of the silicon carbide starting material. It is possible, utilizing the powders of the present invention, to produce a suitable composition in which the silicon carbide is predominantly (more than 50 percent) in the form of alpha silicon carbide. Various mixtures of alpha and beta silicon carbide containing 5 percent or more of alpha silicon carbide may be utilized to produce suitable sintering compositions. Various amounts of amorphous silicon carbide may be included without deleterious effect. The powders of the present invention do not undergo any substantial amount of phase transformation, so that the crystalline phase of the silicon carbide in the starting material will be in essentially the same proportion as the crystalline phase of the finished product. An exception is when large amounts of beta silicon carbide are included in the starting material (50 percent or more). A phase change from beta to alpha will be noted, especially if high sintering temperatures are utilized. However, this does not affect the product, and the precautions previously required to prevent such change need not be taken.

The fine-grained silicon carbide powder of the present invention may be produced by grinding, ball milling, or jet milling larger particles of silicon carbide and subsequently classifying or separating a component which has an average particle size of from about 0.10 to about 2.50 microns, with a maximum size of about 5 microns.

The starting material of the fine-grained silicon carbide powder of the present invention may be obtained from a classified furnace product. In order to meet the purity requirements of the present powders, the furnace product may be treated to remove the impurities. Suitably the product is acid treated, using HF and $HNO_3$ or mixtures of HF and $HNO_3$ to remove excess oxygen and to reduce the impurity content to below the maximum amounts that may be included in the present powders.

The present powders have a maximum particle size of about 5 microns and an average particle size of about 0.10 to about 2.50 microns. It is difficult to obtain accurate particle size distribution for silicon carbide powders having a size less than about 1 micron in size, and therefore surface area may be considered relevant in determining suitable material. Accordingly, the preferred silicon carbide particles for use in the present powders have a surface area of from about 1 to about 100 $m^2/g$. Within this range, it is more preferred that the surface area of the particles range between about 2 and about 50 $m^2/g$, and a range of from about 2 to about 20 $m^2/g$ has been found eminently useful for producing powders of the present invention.

Based upon 100 parts by weight, the preferred composition of the powders of the present invention contain minor amounts of impurities, namely, a maximum of about 2.0 parts of $SiO_2$; a maximum of about 0.25 parts free silicon; a maximum of about 0.50 parts iron; a maximum of about 0.50 parts alkali and alkaline earth metals; and, a maximum of about 3.75 parts total metal oxides.

The silicon carbide powders of the present invention may also contain combinable carbon in amounts of from about 0.05 to about 5.0 percent by weight of the powder. Small amounts of carbon may be found to be beneficial as an aid in subsequent sintering operations by reducing the amounts of oxides that might otherwise remain in the finished sintered product. However, in a preferred composition, the present raw powders contain a maximum of about 0.50 parts by weight of combinable carbon, and, for purposes of controlling the carbon content of the final sintered product, any conbinable carbon that may subsequently be required to product a sinterable powder is separately added.

While it is preferred to have a high purity silicon carbide starting material however, such pure powder compositions are not readily available, and maximum purification is not practical because of economic considerations. While the present powders may contain the total maximum amount of each and all of the critical impurities and still produce sinterable powders, it is to be understood that complete elimination of the recited impurities is to be desired.

The maximum amount of $SiO_2$ is about 2.00 parts per 100 parts by weight of the powder. However, lesser amounts are both desirable and beneficial, and a more ideal maximum is about 0.5 parts.

The maximum amount of iron is about 0.5 parts per 100 parts by weight of the powder. Lesser amounts are beneficial in obtaining a densified product. A more ideal maximum is about 0.2 parts, and best results are obtained when the iron content is less than 0.02 parts.

Sinterable powder compositions may be obtained by mixing the present powders with sintering or densification aids; for example, materials containing boron or beryllium are eminently suited. The densification aid may be in elemental form or in the form of chemical compounds containing the aid. Boron or beryllium additives are usually added in amounts ranging from about 0.03 to about 3.0 percent by weight of the element by weight of the powder. A range of from about 0.1 to about 1.0 percent by weight is aptly suited to densification of the present powders. Mixtures of densification aids may be utilized.

The combinable carbon content of the sintered product is preferably less than about 1.0 percent by weight. In processing the powders of the present invention by the addition of sintering or densification aids, a source of carbon may be added to aid in densification. Suitably this may be done by the addition of a carbonizable organic material which is dispersed throughout the powder. Such material may also perform the function of a temporary binder holding the particles in a desired shape prior to sintering. The amount of carbon added is usually in the range of from about 0.5 to about 4.0 percent by weight, but the added amount will depend upon the carbon in the initial starting powder.

The powders of the present invention, with the addition of densification aids and combinable carbon may be sintered by the prior art processes to yield a high-density, high-strength sintered product.

The invention may be more fully illustrated by the following examples which are not to be interpreted as limiting. Unless otherwise indicated, all parts and percentages are by weight and all temperatures are in degrees Celcius.

EXAMPLE 1

A silicon carbide product from the Acheson process consisting substantially entirely of alpha silicon carbide was ground in a steel ball mill and classified to yield a product having an average particle size of from about 0.10 to about 2.50 microns with a maximum particle size of 5 microns. The milled product was treated with a mixture of HF and $HNO_3$ to remove the residue of iron worn from the steel balls used in the milling operation and to reduce the amount of impurities to the following levels. The product was then washed and dried, and a greenish-tan powder product having the following characteristics was produced:

| | |
|---|---|
| $SiO_2$ | 1.0% maximum |
| $O_2$ | 0.5% maximum |
| Free Silicon | 0.05% maximum |
| Iron | 0.02% maximum |
| Alkali and Alkaline Earth Metals | 0.05% maximum |
| Total Metal Oxides | 2.0% maximum |
| Free Carbon | 0.5% maximum |
| SiC | Remainder |

EXAMPLE 2

97.6 parts of the powder of Example 1 were mixed with particulate boron carbide (B:C=4.08:1) as a densification aid; combinable carbon, added in the form of a beta stage resole phenolic resin produced by Varcum Chemical Company and identified as Resin 8121 and a solution of polyvinyl alcohol in water. The silicon carbide had a surface area of between about 7 and about 15 $m^2/g$. The particulate boron carbide component had a size of less than 10 microns. 0.5 parts of boron carbide, 5 parts of the phenolic resin and 10 parts of a 10 percent solution of polyvinyl alcohol in water were utilized. 200 parts of acetone, a solvent for the phenolic resin, was added and the mixture stirred for 15 minutes. Nitrogen was gently passed into the container to evaporate the acetone and water from the mixture. The mix then reached a putty-like consistancy and, upon continued stirring, began to break up into fine particles. When there was only a faint trace of acetone smell, and the material was dry to the touch, a portion of the powder was removed and compressed in a mold at 16,000 psi. After pressing, the compacted body was heated at 100° C. for 2 hours to cure the temporary binder. After curing, the density was found to be 1.87 g/cc. The cured green product was then placed on a graphite setter and positioned within a closed graphite crucible. The crucible was fed into a tube furnace having a hot zone maintained at 2080° C., at a rate of about 2¾ inches per minute, so that it required about 20 minutes to traverse the 54 inch hot zone. Argon was passed through the tube furnace during this time at about 1 atmosphere of pressure. The cured body was held in the hot zone of 2080° C. for about 45 minutes, and held for about 20 minutes in a cooling chamber to avoid thermal shock. After the body had cooled, the density was found to be 3.08 $gm/cm^3$., about 96 percent of theoretical.

EXAMPLE 3

97.5 parts of the alpha silicon carbide powder described in Example 1 were mixed with 0.5 parts of boron carbide having a maximum particle size of less than 10 microns and with 5 parts of a beta stage resole phenolic resin produced by Varcum Chemical Company and identified as Resin 8121. 2 parts of polyvinyl alcohol dissolved in water were included in the above powder mixture. In addition, the elements or compounds listed in the Additive Column of Table 3-1 were added to seperate portions of the mixture. The resultant mixtures were slurried in an 80% ethanol:20% water system for 1 hour, then dried and granulated to form a free-flowing powder. The powder mixtures were pressed at 10,000 psi into 1⅛ inch diameter pellets and these pellets sintered at 2050° C. with a 25 minute hold at that temperature. The results of the above are shown in Table 3-1.

It will be noted from Table 3-1 that the addition of 1% $SiO_2$ to the powder described in Example 1 brings the total amount of $SiO_2$ in the powder compacts close to the maximum specified, and the resultant fired density is 2.33 $gm/cm^3$, or about 72.7% of a theoretical density of 3.21 $gm/cm^3$. An addition of 3% $SiO_2$ exceeds the maximum amount of $SiO_2$ specified to provide a sinterable powder and the sintered density of compacts made from such a powder mixture is 1.60 $gm/cm^3$, indicating that only very limited densification was obtained.

An addition of a further 0.5% iron brought the iron content of the powder mixture to near the limit of the maximum amount of iron for a sinterable silicon carbide powder. The sintered density of powder compacts made from this powder mixture was 2.60 $gm/cm^3$, about 81% of a theoretical density of 3.21 $gm/cm^3$.

The presence of calcium, sodium and potassium, either singly or in combination, may also be deleterious to the achievement of high density as illustrated in Table 3-1. The powder mixture as described above, made with the silicon carbide powder described in Example 1 and containing no other additives sintered to a density of 3.08 $gm/cm^3$, about 96.0 percent of a theoretical density of 3.21 $gm/cm^3$.

TABLE 3-1

Effect of Metal and Metal Oxide Additions on the Density of Sintered Alpha Silicon Carbide

| Additive | Density Before Sintering $gm/cm^3$ | Density After Sintering $gm/cm^3$ | % of theoretical |
|---|---|---|---|
| 1% $SiO_2$ | 1.48 | 2.33 | 72.7 |
| 3% $SiO_2$ | 1.44 | 1.60 | 49.7 |
| 0.5% Fe | 1.43 | 2.60 | 81.0 |
| 0.1% Ca | 1.57 | 2.62 | 81.6 |
| 0.1% Na | | | |
| 0.1% K | 1.46 | 2.65 | 82.5 |
| No other additive | 1.71 | 3.08 | 96.0 |

EXAMPLE 4

Two predominantly alpha silicon carbide powders, each having a chemical composition as described in Example 1, were utilized to provide the following example showing the effect of particle size on sinterability of cold pressed and sintered powder compacts. Powder 1 had an equivalent average spherical particle size as determined from surface area measurements of about 2.7 microns. Powder 2 was the silicon carbide powder as described in Example 3 and had an equivalent average spherical particle size of about 0.16 microns. These powders were prepared according to the procedure set forth in Example 3. In addition, a mixture of these two powders was prepared according to the same procedure and containing 70 parts of Powder 1 and 30 parts of Powder 2. After sintering at 2080° C., the pressed powder compacts had the properties listed in Table 4-1.

TABLE 4-1

Properties of Pressed Powder Compacts Before and After Sintering to 2080° C. with a 45 Minute Hold at Temperature

| % Powder 1 | % Powder 2 | Cured Density | | Sintered Density | |
|---|---|---|---|---|---|
| | | gm/cm$^3$ | % of theoretical | gm/cm$^3$ | % of theoretical |
| 100 | 0 | 1.56 | 48.6 | 2.26 | 70.4 |
| 70 | 30 | 1.71 | 53.3 | 2.56 | 79.8 |
| 0 | 100 | 1.52 | 47.4 | 3.10 | 96.6 |

What is claimed is:

1. A silicon carbide powder containing:
   (a). From about 5 to about 100 percent by weight alpha crystalline phase silicon carbide,
   (b). said powder containing a maximum of the following components in percent by weight:

| | |
|---|---|
| SiO$_2$ | 2.00 |
| Free Silicon | 0.25 |
| Iron | 0.50 |
| Alkali and Alkaline Earth Metals | 0.50 |
| Total Metal Oxides | 3.75 |

(c). the particles in said powder having an average particle size from about 0.10 to about 2.50 microns,
   (d). said powder characterized by the property of being sinterable under substantially pressureless conditions at a temperature between about 1950° C. and about 2500° C. when mixed with between about 0.05 and about 4.0 percent by weight of combinable carbon and from about 0.03 to about 3.0 percent by weight of a densification aid.

2. The powder of claim 1 wherein alpha crystalline phase silicon carbide is greater than 50 percent of the total silicon carbide content.

3. The powder of claim 1 wherein the maximum amount of SiO$_2$ is 0.5 percent by weight.

4. The powder of claim 1 wherein the maximum amount of iron is 0.20 percent by weight.

5. The powder of claim 1 wherein the maximum particle size is about 5.0 microns.

6. The powder of claim 1 wherein the surface area of the particles is between about 2 and about 50 m$^2$/g.

7. The powder of claim 1 containing between about 0.05 and about 4.0 percent by weight of combinable carbon.

8. A sinterable silicon carbide powder comprising the powder of claim 7 containing a densification aid.

9. The powder of claim 8 wherein the densification aid is added in the range of from about 0.03 to about 3.0 percent by weight.

10. The powder of claim 9 wherein the densification aid is selected from the group consisting of boron, beryllium, their compounds and mixtures thereof.

11. The powder of claim 9 wherein the densification aid is boron carbide.

12. A method of making a sintered silicon carbide body comprising the steps of:
   (a). forming a homogeneous mixture of the powder of claim 8, and
   (b). shaping said mixture into a green product, and
   (c). sintering said green product at a temperature of between about 1950 and about 2500° C., and
   (d). maintaining said temperature for a time sufficient to obtain a silicon carbide ceramic product having a density greater than 75 percent of theoretical.

* * * * *